(12) United States Patent
Chang

(10) Patent No.: US 11,855,466 B2
(45) Date of Patent: Dec. 26, 2023

(54) BATTERY CHARGING CABLE

(71) Applicant: Solomon Chang, Keelung (TW)

(72) Inventor: Solomon Chang, Keelung (TW)

( * ) Notice: Subject to any disclaimer, the term of this patent is extended or adjusted under 35 U.S.C. 154(b) by 140 days.

(21) Appl. No.: 17/403,789

(22) Filed: Aug. 16, 2021

(65) Prior Publication Data
US 2023/0049910 A1   Feb. 16, 2023

(51) Int. Cl.
*H02J 7/00* (2006.01)
*H02J 7/34* (2006.01)
*H01R 13/66* (2006.01)

(52) U.S. Cl.
CPC ........ *H02J 7/0029* (2013.01); *H01R 13/6675* (2013.01); *H02J 7/0045* (2013.01); *H02J 7/0047* (2013.01); *H02J 7/342* (2020.01); *H02J 7/007182* (2020.01)

(58) Field of Classification Search
CPC ...... H02J 7/0029; H02J 7/0045; H02J 7/0047; H02J 7/342; H02J 7/007182; H01R 13/6675
USPC ................. 320/103, 105, 107, 114, 134, 162
See application file for complete search history.

(56) References Cited

U.S. PATENT DOCUMENTS

| | | | |
|---|---|---|---|
| 10,826,286 B2* | 11/2020 | Guo | H02J 7/00304 |
| 2016/0190794 A1* | 6/2016 | Forghani-Zadeh | H02H 9/045 |
| | | | 361/86 |
| 2017/0288435 A1* | 10/2017 | Miller | H02J 7/007194 |
| 2018/0006489 A1* | 1/2018 | Pattisall | H02J 7/14 |
| 2018/0233934 A1* | 8/2018 | Miller | H02J 7/0013 |
| 2020/0119540 A1* | 4/2020 | Buhari | H03K 17/0822 |
| 2020/0180174 A1* | 6/2020 | Zhang | B26B 11/008 |
| 2020/0360707 A1* | 11/2020 | Christiansen | H02J 7/0045 |

* cited by examiner

*Primary Examiner* — Edward Tso
*Assistant Examiner* — Aaron Piggush
(74) *Attorney, Agent, or Firm* — Law Office of Michael Chen; Che Yang Chen

(57) ABSTRACT

A battery charging cable can be connected to a power supplying device and supply electricity to, and thereby charge, the battery of another device when the battery is low in power. The battery charging cable includes a USB Type-C connector at one end and a positive-electrode clamp and a negative-electrode clamp at the other end, wherein the clamps can be respectively clamped to the positive and negative electrodes of the battery of a device to be charged. With the battery charging cable supporting a USB Power Delivery protocol, and the USB Type-C connector configured to provide a relatively high voltage and power, the battery charging cable provides overload protection and has great power transmission performance.

5 Claims, 4 Drawing Sheets

BATTERY CHARGING CABLE

BACKGROUND OF THE INVENTION

1. Technical Field

The present invention relates to a battery charging cable and more particularly to a battery charging cable that not only can serve as a rescue charging cable to connect the battery of an electric device with relatively high power consumption (e.g., a car, an electric hand tool, or an electric bicycle) to an external power source when the battery of the electric device is low in power, but also provides overload protection.

2. Description of Related Art

A conventional battery charging cable includes a pair of cables, a connector provided at one end of the pair of cables, and a positive-electrode clamp and a negative-electrode clamp provided at the other end of the pair of cables. To use, the battery charging cable is clamped at one end to the battery of a device to be charged and is connected at the other end to a power supplying device.

The existing battery charging cables do not have any protective design. Therefore, should a short circuit or an exceedingly high transient current occur during use, the device being charged or the power supplying device may be damaged and thus endanger the user.

In addition, the USB Type-C interfaces have gradually become the mainstream connector interfaces because a USB Type-C connector is reversible and can transmit a relatively large amount of electricity to meet the higher and higher power demand.

While the previous USB 2.0 interfaces do not have special requirements for cables, the USB Type-C interfaces are electronically marked, or more particularly have an e-marker chip that provides overload protection when the current transmitted through a USB Type-C connector or cable exceeds the current capacity of the connector or cable.

Moreover, the USB Power Delivery (USB PD) protocol essentially defines data communication, and the required electric signals, between a power supplying end (a provider) and a power receiving end (a consumer) so that the voltage and current to be delivered from the provider to the consumer can be subsequently determined.

BRIEF SUMMARY OF THE INVENTION

The present invention provides a battery charging cable that uses a USB Type-C connector supporting the USB PD protocol as one of its connection interfaces in order to supply electricity to a device requiring a relatively high power or operating on a relatively large battery. The battery charging cable allows the voltage/current index to be raised to 20 V/5 A so as to provide a maximum power of 100 W. The battery charging cable also has an overload protection mechanism, according to which the voltage and current to be delivered through the battery charging cable are determined by identifying the data transmitted between the two ends of the battery charging cable.

The primary objective of the present invention is to provide a transmission cable capable of transmitting relatively high electric power.

The secondary objective of the present invention is to provide a transmission cable that affords overload protection.

To achieve the foregoing objectives, the connector at one end of the battery charging cable of the present invention uses a USB Type-C interface to connect to a power supplying device, and the other end of the battery charging cable is provided with a positive-electrode clamp and a negative-electrode clamp to be respectively clamped to the positive electrode and the negative electrode of the battery of a device to be charged, in order to transmit electricity from the power supplying device to the device to be charged. The highest voltage and power supported by the USB PD protocol and the USB Type-C interface make it possible to increase charging efficiency so that the device to be charged can be rapidly charged to the desired level while being protected from being overloaded.

DETAILED DESCRIPTION OF THE INVENTION

Figure 1:
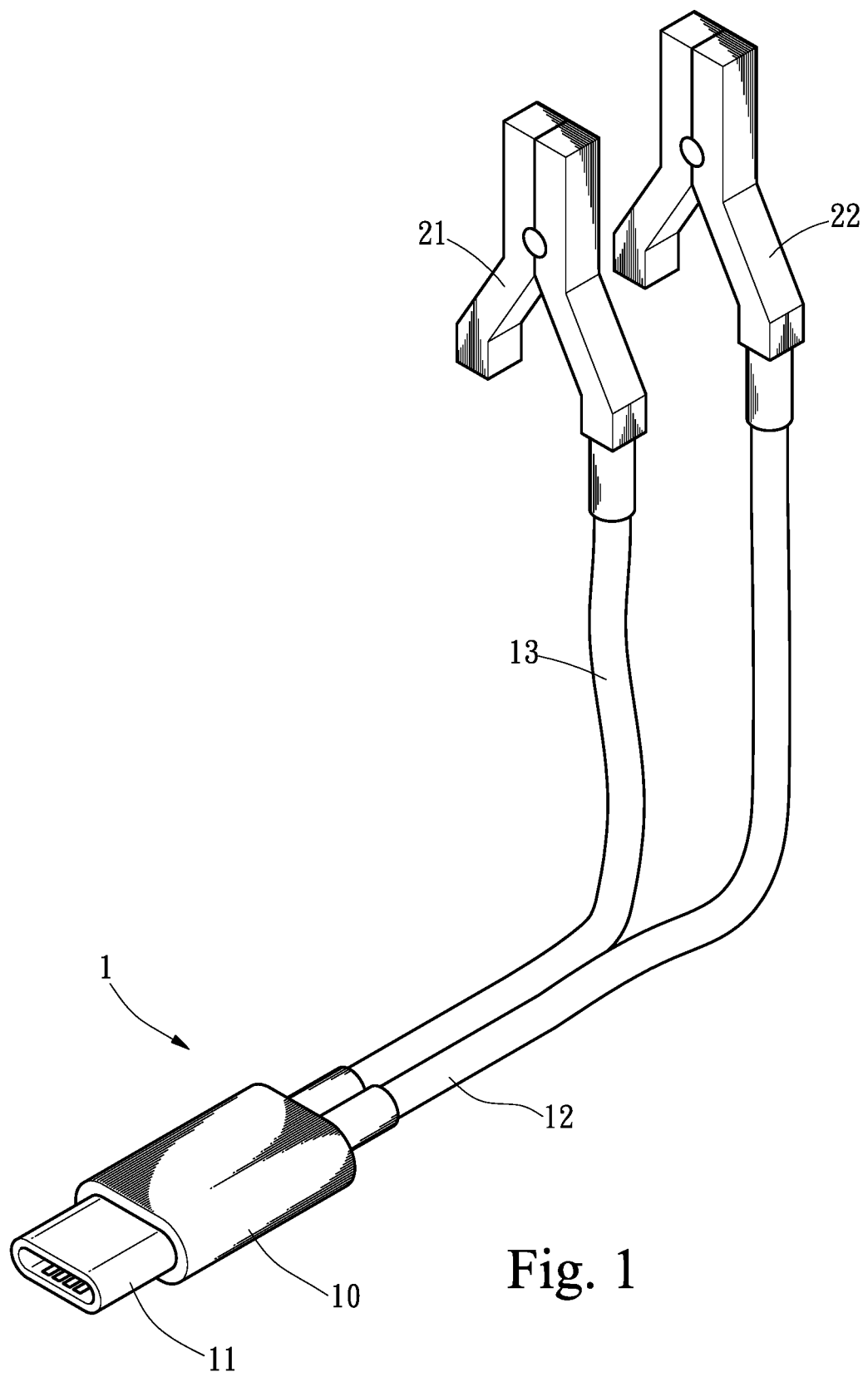
FIG. 1 is a perspective view of the battery charging cable according to a preferred embodiment of the present invention.

Referring to FIG. 1, the battery charging cable 1 according to an embodiment of the present invention includes a connector body 10 at one end. The front end of the connector body 10 is fixedly provided with a connector 11 having a USB Type-C interface. The connector 11 is configured for connecting with a power supplying device and, according to the specifications of the USB Type-C interface, can transmit a relatively high current while supporting an overload protection protocol. The power supplying device may be a power bank 3 or a charging plug 31 as depicted in FIG. 2, in which the battery charging cable 1 is shown as transmitting an electric current to, i.e., charging, a car battery 4.

The other end of the connector body 10 is provided with a positive-electrode cable 12 and a negative-electrode cable 13. The positive-electrode cable 12 and the negative-electrode cable 13 may differ in color (e.g., one being red, and the other being black; or one being blue, and the other being white) to facilitate distinction. The positive-electrode cable 12 has a terminal end provided with a positive-electrode clamp 22, and the negative-electrode cable 13 has a terminal end provided with a negative-electrode clamp 21. The positive-electrode clamp 22 and the negative-electrode clamp 21 are configured to be clamped respectively to the positive electrode and the negative electrode of, for example, the car battery 4 in FIG. 2.

Figure 2:
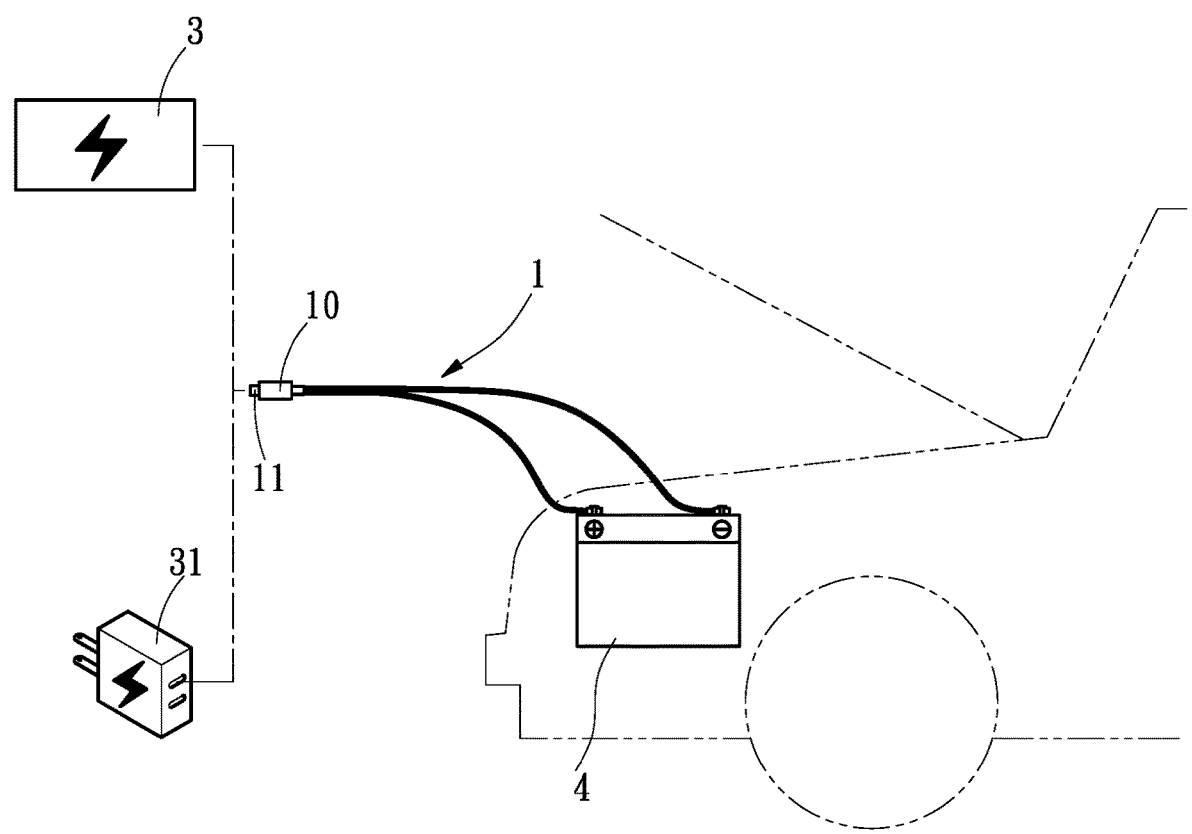
FIG. 2 shows a state of use of the battery charging cable in FIG. 1.

With continued reference to FIG. 2, the power bank 3, which is portable, can function as a rescue charging device because its capacity has been greatly increased in recent years. Therefore, the USB Type-C connector 11 at one end of the battery charging cable 1 can be connected to the power bank 3 or the charging plug 31 in order for the power bank 3 or the charging plug 31 to serve as a power source, and the positive- and negative-electrode clamps at the other end of the battery charging cable 1 can be clamped respectively to the positive and negative electrodes of the battery 4 to be charged in order to transmit electricity from the power bank 3 or the charging plug 31 to the battery 4.

Figure 3:
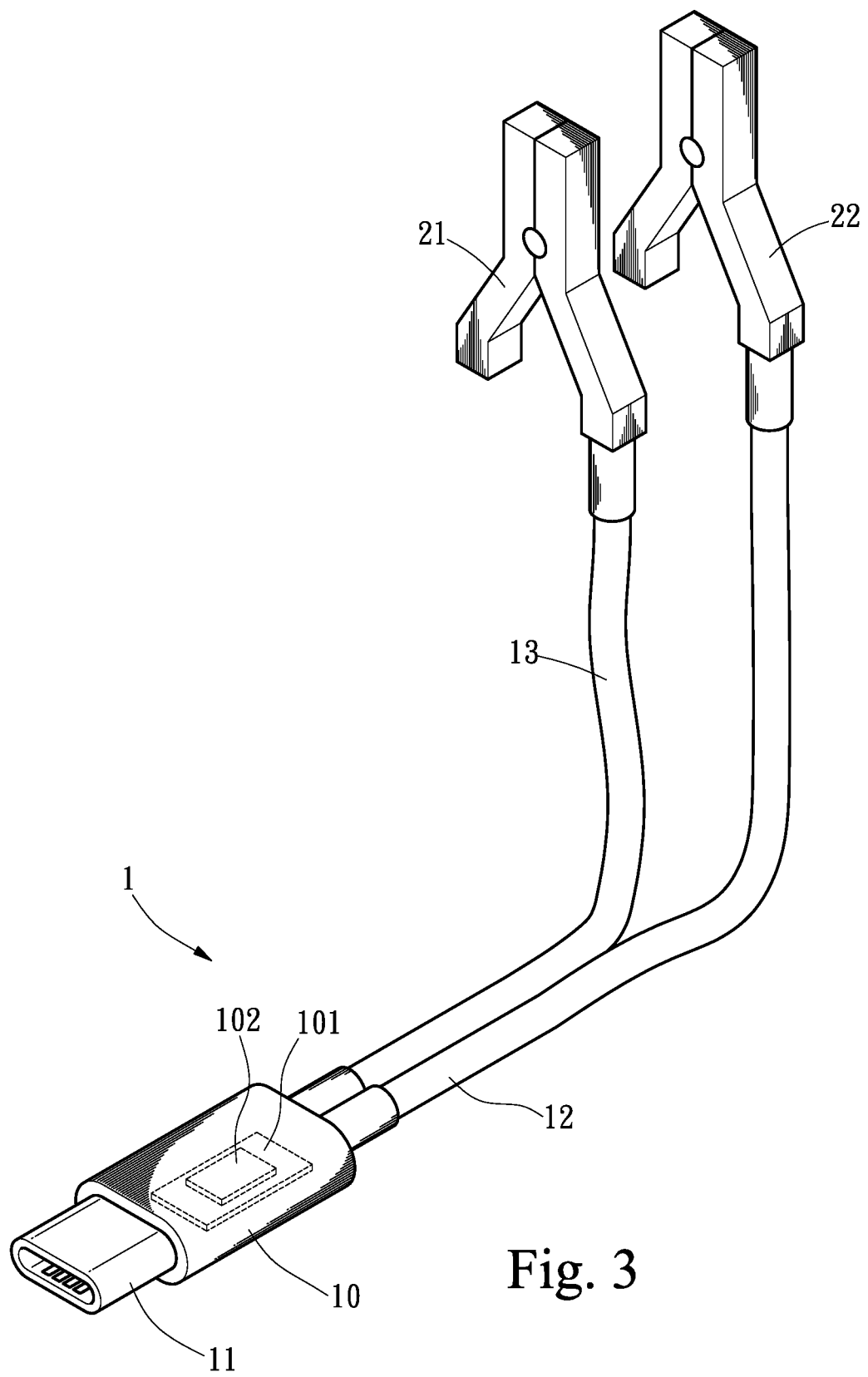
FIG. 3 is another perspective view of the battery charging cable in FIG. 1.

Referring also to FIG. 3, the connector body 10 is provided therein with a printed circuit board (PCB) substrate 101. The PCB substrate 101 is provided with a control chip 102 configured principally according to the USB Power Delivery (USB PD) protocol, which essentially defines data communication between a power supplying end (a provider) and a power receiving end (a consumer). The control chip 102 serves mainly to control a current detection circuit, a short-circuit protection device, and a transformer circuit. The current detection circuit can detect the voltage of a battery to be charged so that the current to be transmitted to the battery can be controlled accordingly. The short-circuit protection device can provide protection when the positive- and negative-electrode clamps are connected to the wrong electrodes or when a short circuit is formed. Thus, the battery charging cable 1 provides overload protection in addition to a high charging efficiency made possible by the relatively high voltage and power supported by the USB Type-C interface.

Figure 4:
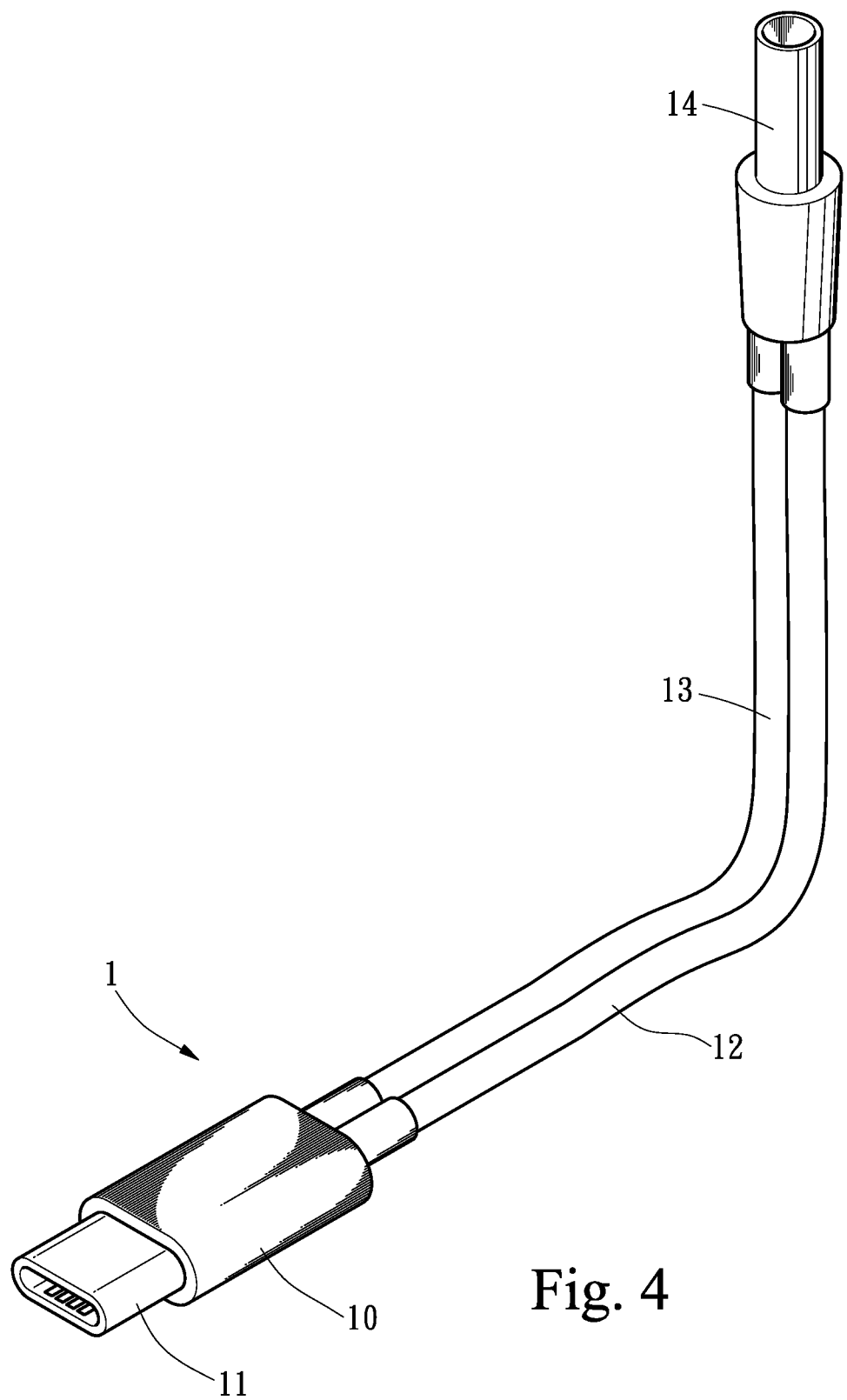
FIG. 4 is a perspective view of the battery charging cable according to another embodiment of the invention.

FIG. 4 shows the battery charging cable 1 according to another embodiment of the present invention. This battery charging cable 1 also includes the connector body 10 at one end, with the USB Type-C connector 11 provided at the front end of the connector body 10, and with the positive-electrode cable 12 and the negative-electrode cable 13 provided at the other end of connector body 10. The battery charging cable 1 in this embodiment is different from its counterpart in the previous embodiment in that the other end of the battery charging cable 1 is provided with a common power connector 14 in order to work with the connection interface of, and thus be able to charge, such electrical equipment on the market as direct-current (DC) electric tools and electric bicycles.

The embodiments described above are only some preferred ones of the present invention and are not intended to be restrictive of the scope of the invention. Any equivalent changes or modifications that do not depart from the technical concept disclosed herein shall fall within the scope of the appended claims.

What is claimed is:

1. A battery charging cable, wherein the battery charging cable has an end configured as a connector body, the connector body has a front end fixedly provided with a connector having an interface of the type made under the Universal Serial Bus (USB) Type-C trademark, the connector body has a rear end provided with a positive-electrode cable and a negative-electrode cable, the positive-electrode cable and the negative-electrode cable differ in color so as to be distinguishable from each other, the positive-electrode cable has a terminal end provided with a positive-electrode-connecting device to enable power transmission, and the negative-electrode cable has a terminal end provided with a negative-electrode-connecting device to enable power transmission, the battery charging cable being characterized in that:

the connector body is provided therein with a printed circuit board (PCB) substrate, the PCB substrate is provided with a control chip, the control chip controls a current detection circuit, a short-circuit protection device, and a transformer circuit in order to control power transmission through the battery charging cable, and the connector passes through the interface to allow transmission of a current and support an overload protection while transmitting electricity from a power supplying device to, and thereby charging, a battery of a device to be charged.

2. The battery charging cable of claim 1, wherein the power supplying device is a power bank.

3. The battery charging cable of claim 1, wherein the power supplying device is a charging plug.

4. The battery charging cable of claim 1, wherein the positive-electrode-connecting device at the terminal end of the positive-electrode cable is a positive-electrode clamp, and the negative-electrode-connecting device at the terminal end of the negative-electrode cable is a negative-electrode clamp.

5. The battery charging cable of claim 1, wherein the positive-electrode-connecting device at the terminal end of the positive-electrode cable is a positive-electrode connector, and the negative-electrode-connecting device at the terminal end of the negative-electrode cable is a negative-electrode connector.

* * * * *